(12) United States Patent
Abbondanzio et al.

(10) Patent No.: US 10,111,273 B2
(45) Date of Patent: Oct. 23, 2018

(54) COMMUNICATION PATHS HIERARCHY FOR MANAGED COMPUTING DEVICE

(71) Applicant: Lenovo Enterprise Solutions (Singapore) PTE. LTD., New Tech Park (SG)

(72) Inventors: Antonio Abbondanzio, Raleigh, NC (US); Matthew Robert Alcorn, Durham, NC (US); James Gordon McLean, Raleigh, NC (US); Jared Siirila, Morrisville, NC (US); Randall William Worzella, Raleigh, NC (US)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 48 days.

(21) Appl. No.: 15/163,466

(22) Filed: May 24, 2016

(65) Prior Publication Data

US 2017/0347364 A1    Nov. 30, 2017

(51) Int. Cl.
*H04W 76/15*     (2018.01)
*H04L 12/721*    (2013.01)
(Continued)

(52) U.S. Cl.
CPC ............ *H04W 76/15* (2018.02); *H04L 45/00* (2013.01); *H04L 45/12* (2013.01); *H04L 45/302* (2013.01); *H04L 67/025* (2013.01); *H04W 40/02* (2013.01)

(58) Field of Classification Search
CPC ....... H04L 45/302; H04L 45/00; H04L 45/12; H04L 67/025; H04W 76/15; H04W 40/02
See application file for complete search history.

(56) References Cited

U.S. PATENT DOCUMENTS

| | | | | |
|---|---|---|---|---|
| 5,550,815 | A | * | 8/1996 | Cloonan ............. H04L 12/5601 370/396 |
| 5,845,116 | A | * | 12/1998 | Saito ..................... G06F 9/4862 718/103 |

(Continued)

OTHER PUBLICATIONS

Snader, R. et al., "Improving Security and Performance in the Tor Network through Tunable Path Selection", IEEE Transactions on Dependable and Secure Computing, Jul. 14, 2011, 15 pp.

(Continued)

*Primary Examiner* — Omar J Ghowrwal
(74) *Attorney, Agent, or Firm* — Jason Friday (57) ABSTRACT

Communication paths between a management computing device and a managed computing device are determined. The communication paths have different communication modalities. Current situational factors governing a current communication need between the management computing device and the managed computing device are determined. A hierarchy of the communication paths, from a highest priority communication path to a lowest priority communication path, is determined based on the current situational factors. The management request for the current communication need is successively sent, from the management computing device to the managed computing device, using the one of the communication paths starting with the highest communication path and proceeding through the hierarchy until the current communication need has been fulfilled.

20 Claims, 4 Drawing Sheets

(51) Int. Cl.
   *H04L 29/08*    (2006.01)
   *H04L 12/725*   (2013.01)
   *H04L 12/701*   (2013.01)
   *H04W 40/02*    (2009.01)

(56) References Cited

U.S. PATENT DOCUMENTS

| | | | | |
|---|---|---|---|---|
| 6,438,110 | B1* | 8/2002 | Rai | H04L 41/0896 370/254 |
| 6,529,498 | B1* | 3/2003 | Cheng | H04L 12/185 370/351 |
| 6,563,835 | B1* | 5/2003 | Chen | H04L 12/5601 370/395.1 |
| 6,584,071 | B1* | 6/2003 | Kodialam | H04L 45/02 370/238 |
| 7,281,058 | B1* | 10/2007 | Shepherd | H04L 12/1836 709/227 |
| 7,792,989 | B2 | 9/2010 | Toebes et al. | |
| 7,796,520 | B2 | 9/2010 | Poustchi et al. | |
| 8,650,279 | B2 | 2/2014 | Mehta et al. | |
| 2005/0066052 | A1* | 3/2005 | Gupta | H04L 45/02 709/238 |
| 2005/0278419 | A1 | 12/2005 | Morris | |
| 2006/0117020 | A1 | 6/2006 | Toebes et al. | |
| 2006/0136893 | A1 | 6/2006 | Blossom et al. | |
| 2010/0063999 | A1 | 3/2010 | Hur et al. | |
| 2012/0226739 | A1 | 9/2012 | Kim et al. | |
| 2013/0007237 | A1 | 1/2013 | Mehta et al. | |
| 2013/0091283 | A1* | 4/2013 | Omar | H04L 41/0896 709/226 |
| 2013/0336192 | A1* | 12/2013 | Zhao | H04L 45/16 370/312 |
| 2014/0063057 | A1 | 3/2014 | Eronen et al. | |
| 2016/0110284 | A1* | 4/2016 | Athalye | G06F 12/084 711/120 |
| 2016/0128123 | A1* | 5/2016 | Li | H04W 72/08 370/252 |
| 2016/0180045 | A1 | 6/2016 | Syed | |
| 2016/0202676 | A1 | 7/2016 | Sato | |
| 2016/0246896 | A1* | 8/2016 | Arora | G06F 17/30867 |
| 2017/0041398 | A1 | 2/2017 | Kumar et al. | |
| 2017/0186212 | A1* | 6/2017 | Ai | G06T 15/005 |
| 2017/0205791 | A1 | 7/2017 | Yang et al. | |
| 2017/0207999 | A1* | 7/2017 | Scott | H04L 45/304 |
| 2017/0237815 | A1 | 8/2017 | Arsenault et al. | |
| 2017/0280459 | A1 | 9/2017 | Ogrinz | |
| 2017/0353357 | A1 | 12/2017 | Abbondanzio | |

OTHER PUBLICATIONS

Internet web page, http://windows.microsoft.com/en-US/windows-8/metered-internet-connections-frequently-asked-questions, as captured by Internet Archive Wayback Machine on Jan. 12, 2015, 3 pp.

"How to Enable Instant Hotspot in iOS 8 and How It Works", online <http://www.igeeksblog.com/how-to-enable-instant-hotspot-in-ios-8/>, Jan. 7, 2015, 10 pp.

"LetsMeetApp—nearby friends notification on the App Store", online <https://itunesapple.com/us/app/letsmeetapp-nearby-friends/id699409128?mt=8>, Oct. 23, 2015, 2 pp.

* cited by examiner

COMMUNICATION PATHS HIERARCHY FOR MANAGED COMPUTING DEVICE

BACKGROUND

Entities like corporations and other organizations generally manage or have managed for them a large number of computing devices, such as servers. Such computing devices are typically managed from a different, management computing device, which may be a desktop or laptop computer, a tablet computing device, a smartphone, or another type of mobile or non-mobile computing device. An administrator, for instance, may log onto a managed computing device from a management computing device to change settings of the managed device, to install or uninstall software on the managed device, and so on. That is, the managed computing device is remotely accessed by a user, who may be in the same room as the managed device, in a different part of the same building or location, or even across the globe from where the managed device is located.

SUMMARY

An example method includes determining communication paths between a management computing device and a managed computing device. The communication paths have different communication modalities. The method includes determining current situational factors governing a current communication need between the management computing device and the managed computing device. The method includes determining a hierarchy of the communication paths, from a highest priority communication path to a lowest priority communication path, based on the current situational factors. The method includes successively sending a management request for the current communication need, from the management computing device to the managed computing device, using the one of the communication paths starting with the highest communication path and proceeding through the hierarchy until the current communication need has been fulfilled.

An example non-transitory computer-readable data storage medium stores computer-executable code executable by a management computing device for a managed computing device, to perform a method. The method includes generating a hierarchy of communication paths between the management computing device and the managed computing device and having different communication modalities, by evaluating the communication paths against a plurality of current situational factors governing a current communication need between the management computing device and the managed computing device. The method includes setting a current communication path to a highest priority communication path of the hierarchy. The method includes repeating the following. A management request to satisfy the current communication need is transmitted from the management computing device to the managed computing device over the current communication path. If no response from the managed computing device is received and the current communication path is not a lowest priority communication path of the hierarchy, the current communication path is set to a next lower-in-priority communication path of the hierarchy. The foregoing is repeated until the response from the managed computing device is received, or no response from the managed computing device is received and the current communication path is the lowest priority communication path.

An example management computing device for a managed computing device includes communication hardware to communicate with the managed computing device over communication paths having different communication modalities. The management computing device includes a processor, and a non-transitory computer-readable data storage medium storing computer-executable code. The code is executable by the processor to realize current situational factor logic to determine a plurality of current situational factors governing a current communication need between the management computing device and the managed computing device. The code is executable by the processor to realize hierarchy logic to determine a hierarchy of the communication paths, from a most preferred communication path to a least preferred communication path, by evaluating the current situational factors. The code is executable by the processor to realize transmission logic to, starting with the most preferred communication path and proceeding through the hierarchy to the least preferred communication path, use a current communication path of the hierarchy to transmit a management request from the management computing device to the managed computing device for the current communication need, until the current communication need has been fulfilled.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, a managed computing device like a server is usually managed remotely from a management computing device. In general, there is a single communication path, which has a single communication modality, by which the management computing device communicates with the managed computing device. A communication modality can be a type of network technology, a type of network communication standard, and so on. Different examples of communication modalities include integrated platform management interface (IPMI) communications, wired communications like Ethernet communications, out-of-band (OOB) communications, near-field communications (NFC), telephony communications, and cellular communications.

A problem with having a single communication path is that if the communication path goes down for any reason, the management computing device and the managed computing device cannot communicate with one another. Robustness that may exist within a particular communication modality is ineffective in this case if the entire modality of the communication path fails. For example, there may be a number of communication nodes between the management computing device and the managed computing device. If a path among the nodes fails, another path may be able to be employed. However, if the various paths still share the same communication modality, such as Ethernet communication, if the modality itself fails, then the ability to route communications among the nodes in different ways does not matter—the management and managed computing devices still will not be able to communicate with one another.

Having more than one communication path, each with a different communication modality, is less common. In general, when there is more than one communication path, each with a different modality, one is relegated as the primary communication path, and the other paths are backup communication paths that are used just if the primary path fails. This can be problematic, because certain attributes of the primary communication path, such as security and speed, may not be present on the backup path(s), resulting in less than optimal communication between the management and managed computing devices. Furthermore, even if no communication path is considered as the primary path, there typically is no way to leverage the advantages of the modalities of the communication paths and lessen the disadvantages of these modalities when selecting which communication path to use for a certain type of communication.

Disclosed herein are techniques that address these and other shortcomings. The communication paths between a management computing device and a managed computing device are determined, where the paths have different communication modalities. The current situational factors governing a current communication need between the management and managed computing devices are also determined. Such situational factors can include the required security of the current communication need, the required urgency of the current communication need, and the type and/or amount of data of the communication need. Other situational factors can include the length of time since the last contact with the managed computing device, the amount of power available on the management computing device to satisfy the current communication need, as well as the desired monetary cost to satisfy the communication need.

Based on the current situational factors governing the current communication need, the communication paths are ordered in a hierarchy from a highest priority communication path to a lowest priority communication path. Then, starting with the highest priority path and proceeding through the hierarchy on a path-by-path basis to the lowest priority path, the management computing device sends a management request to the managed computing device over the current path, until the current communication need has been fulfilled. As such, if the management computing device cannot reach the managed computing device over the highest priority communication path, the management device tries the next highest priority communication path, and so on through the hierarchy, until the managed computing device is reached.

In this way, the highest priority path may dynamically vary, depending on the current communication need in question and the communication modalities of the available communication paths between the management and managed computing devices. For example, if the current communication need calls for the transmission of a large amount of data from the managed computing device that is not confidential, a communication path over the Internet that is not encrypted may be selected. As another example, if the current communication need specifies a small amount of data that is highly confidential, a communication path that is a direct telephony connection to the managed computing device may be selected.

Figure 1:
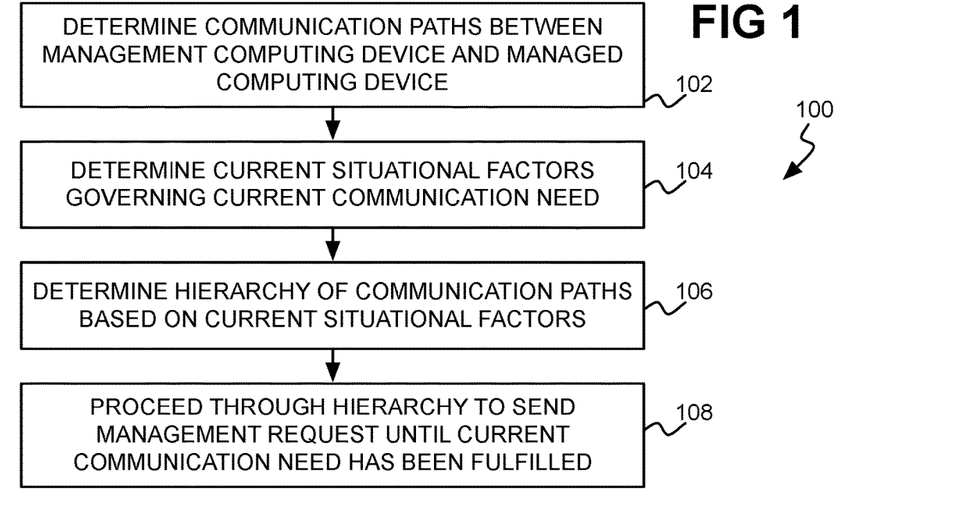
FIG. 1 is a flowchart of an example method for generating and using a hierarchy of communication paths to communicate with a managed computing device.

FIG. 1 shows an example method 100 for generating and using a hierarchy of communication paths between a management computing device and a managed computing device for the management computing device to communicate with the managed computing device. The managed computing device may be a server, or another type of computing device that is subject to remote management. The management computing device may be a client computing device of an administrator responsible for management the managed computing device. For example, the client computing device may be a desktop or laptop computer, a tablet computing device, a smartphone, another type of mobile computing device, or another type of computing device. At least some parts of the method 100 can be performed by the management computing device. For example, the method 100 may be implemented as computer-executable code stored on a non-transitory computer-readable data storage medium and executed by a processor of the management computing device.

The communication paths between the management and managed computing devices are determined (102). As noted above, the communication paths have different communication modalities. A communication path is available between the management and managed computing devices in one implementation if both computing devices are able to communicate using the same communication modality. For example, a management computing device like a smartphone that has NFC capability cannot communicate with the managed computing device using this communication modality if the managed computing device also does not have NFC capability.

The management computing device may determine the communication paths between itself and the managed computing device based on prior information that was acquired regarding the managed computing device. For example, the management computing device may have a database that for the managed computing device, stores the communication modalities by which the managed computing device is able to communicate. To determine the communication paths between the management computing device and the managed computing device, then, the management computing device in this example determines the communication modalities by which it is able to communicate, and compares these modalities against those by which the managed computing device is able to communicate. The communication paths determined are thus those for which both the managed computing device and the management computing device have communication modalities in common.

Figure 2:
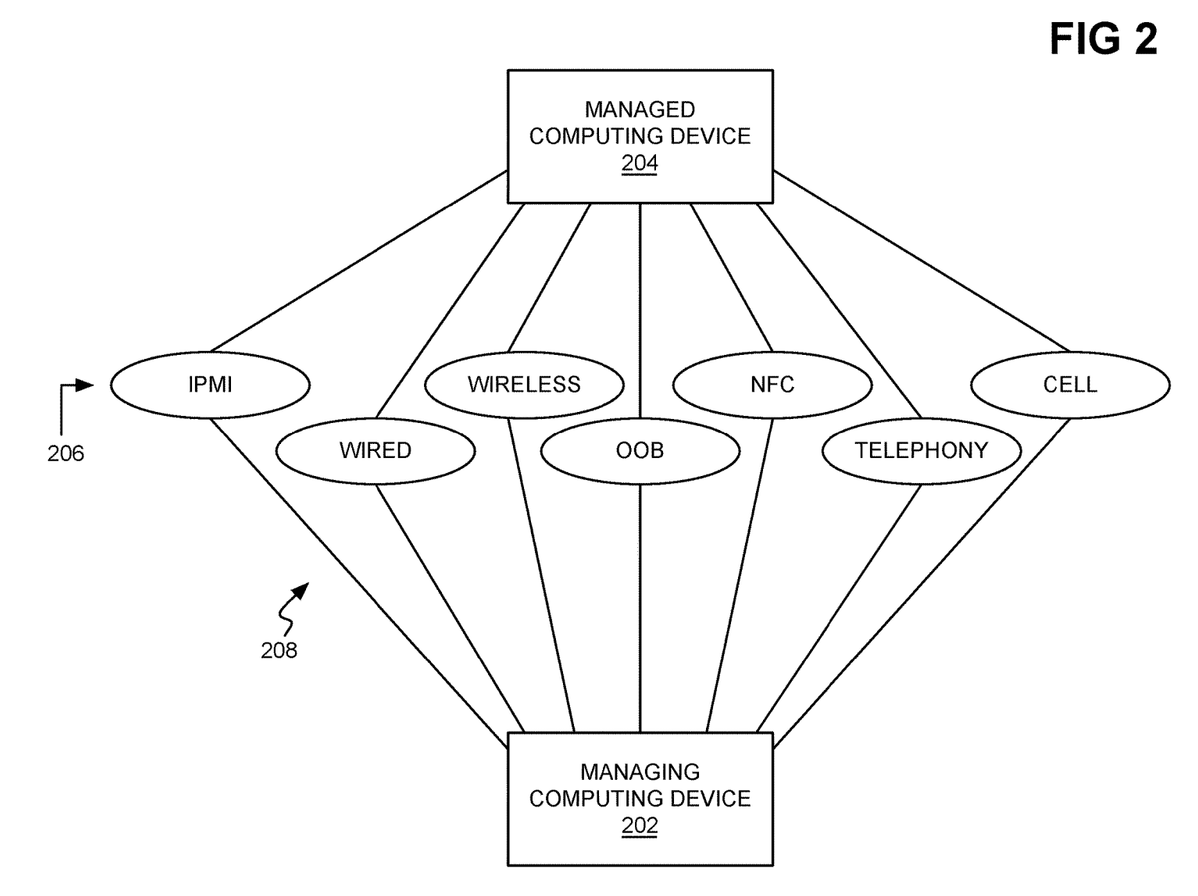
FIG. 2 is a diagram of example communication paths having different example communication modalities, between a management computing device and a managed computing device.

FIG. 2 shows example communication paths 208 having communication modalities 206, between a management computing device 202 and a managed computing device 204. The example communication modalities 206 include IPMI communications, wired communications, wireless communications, OOB communications, NFC, telephony communications, and cellular communications. The modalities 206 can be mutually non-exclusive with one another. For example, IPMI communications are communications according to the IPMI standard, but which may be transmitted using wired communications or wireless communications. Similarly, telephony communications may be wired communications, whereas cellular communications are wireless communications. NFC is one type of OOB communication, and telephony and cellular communications that do not, for instance, utilize the Internet may be another type of OOB communication.

Referring back to FIG. 1, the current situational factors governing a current communication need between the management computing device and the managed computing device are determined (104). The current communication need is the reason why the management computing device has to communicate with the managed computing device to receive information from the managed computing device. For example, this may include a need for current status information regarding the managed computing device. The communication need may be for current settings of the managed computing device. The communication need may be to configure settings of the managed computing device.

The current situational factors governing the current communication need are the factors of the current situation in which the current communication need is occurring. For example, the factors can include the required security of the communication need. Apart from the data that is subject to the communication need, security itself can separately be an issue. A configuration setting change of a managed computing device that may normally not be considered a high-security change may be if the managed computing device itself, for instance, belongs to or is used by a military or intelligence organization, as one example. The factors can also include the required urgency of the current communication need. If, for instance, it is determined that the managed computing device is under attack, then it may be urgent to change settings of the device to mitigate the ability of such hacking attempts from compromising the security of the data stored on the managed device. The factors can include the type of data of the current communication need, such as whether the data being transmitted to or the data that is being requested from the managed computing device is confidential or otherwise sensitive.

The factors can include the amount of data of the current communication need. For example, if the current communication need is for a copy of all log records stored on the managed computing device, the amount of data is relatively voluminous as compared to that related to a current communication need for a current setting of the managed computing device. User preference can be a current situational factor; that is, a user can specify that some communication needs are more important than other communication needs. The factors can include the length of time since the last contact with the managed computing device. For example, the managed computing device may be expected to send regular status updates, such that one current situational factor is the number of such updates that the management computing device has expected to receive recently but has not.

Furthermore, for certain types of communication modalities, such as cellular communications like long term evolution (LTE) mobile data communications, satisfying the current communication need may result in the use of a management computing device like a smartphone. As such, the current situational factors may be the amount of power available on the smartphone to satisfy the current communication need. A current communication need that may require significant back-and-forth communications between the smartphone and the managed computing device over the course of an hour to satisfy will use more of the smartphone's available power than a need that just necessitates a single request from the smartphone with a single response back from the managed computing device. Similarly, the user of the smartphone may incur data costs in sending and receiving data between the smartphone and the managed computing device. Therefore, the desired monetary cost to satisfy the current communication need can be a current situational factor.

The management computing device can determine the current situational factors. For instance, the required security may be specified by an administrator or other user when making a management request to satisfy a current communication need, or the administrator may have specified a default security for all communication between the management and managed computing devices. The management computing device may determine the required security by comparing the other current situational factors against a database that specifies the security necessitated by them. For example, if the data being requested is a set of all user names and passwords stored on the managed computing device, then a database entry may indicate that data of this type is of high security.

The required urgency may also be specified by an administrator or other user when making a management request to satisfy a current communication need, or the administrator may have specified a default urgency for communication between the management and managed computing devices. The management computing device may determine the required urgency by similarly inspecting the other current situational factors. For example, if the managed computing device is expected to provide status updates every ten minutes, but has not provided any status update in more than three hours, then the current communication need for such a status update is more urgent as compared to if just the most recently expected status update was not provided.

The management computing device can determine the type of data of the current communication need from the need itself, which generally may specify the data that is to be requested from the managed computing device and thus the type of this data. Similarly, the management computing device can determine the amount of data of the current communication need from the need itself. The logic of the management computing device may be preprogrammed to know that a request for all the log data of the managed computing device is a larger amount of data than the current values of a limited number of settings of the managed device. The managed computing device can determine user preference as a current situational factor by retrieving such user preference as stored in a database or other storage. The management computing device itself may track the length of time since the managed computing device last made attempted contact, and as such can determine this length of time in a straightforward manner.

The amount of power available on the management computing device can likewise be determined by the management computing device either retrieving the current power available on itself, or on the proxy device that will be used to satisfy the current communication need in relation to the managed computing device. For example, if the management computing device is a desktop or laptop computer without NFC capability, the management computing device may request that the administrator or other user use a smartphone that has NFC capability to communicate with the managed computing device, such that the available power on the smartphone is read by the desktop or laptop computer or provided by the user of the smartphone to the computer. The management computing device can determine the desired monetary cost to satisfy the current communication need based on the amount of data that will likely be transmitted or received to satisfy the need, in conjunction with the cost per unit of data transmitted or received. The latter cost information may be known a priori to the management computing device, or solicited from the administrator or other user.

Once the communications paths between the management and managed computing devices have been determined, as well as the current situational factors governing the current communication need have been determined, a hierarchy of the communication paths is determined or generated based on the current situational factors (106). In varying implementations, the management computing device can determine the hierarchy using a weight-based approach, a rule-based approach, or a combination weight-and-rule-based approach. The hierarchy is an ordered list of the communication paths that can be employed by the management computing device to communicate with the managed computing device to satisfy the current communication need, from a highest priority, or most preferred, communication path to a lowest priority, or least preferred, communication path.

In general, the hierarchy is determined by matching attributes of the communication modalities of the communication paths against the current situational factors governing the current communication need. Depending on the current situational factors, some communication modalities and thus some communication paths may be more suitable than others for the management computing device to communicate with the managed computing device. Furthermore, generating the hierarchy may completely discount one or more of the communication paths that are otherwise available between the management and managed computing device, in that such paths do not become part of the hierarchy. For example, if a current situational factor is that the communication need is to be fulfilled as quickly as possible, a communication path having a communication modality that will take too long to satisfy the communication need may not become part of the hierarchy, and therefore not attempted by the management computing device to communicate with the managed computing device.

Figure 3:
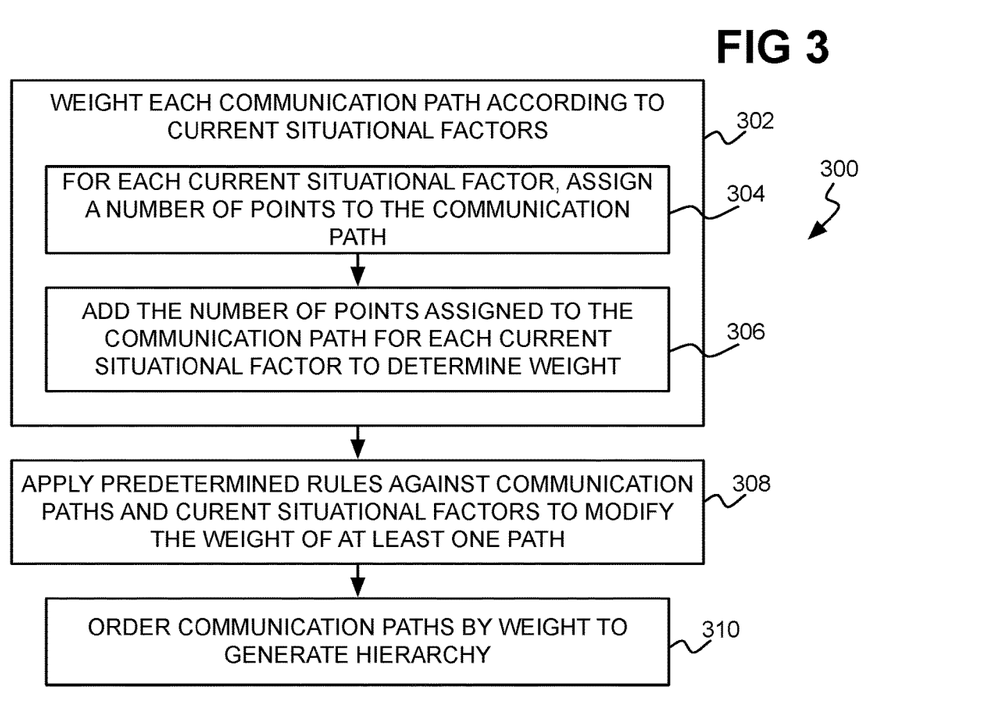
FIG. 3 is a flowchart of an example method for determining a hierarchy of communication paths between a management computing device and a managed computing device.

FIG. 3 shows an example method 300 for determining or generating a hierarchy of communication paths between a management computing device and a managed computing device. The management computing device can perform the method 300, such as to implement part 106 of the method 100. As such, the method 300 may be implemented as computer-executable code stored on a non-transitory computer-readable data storage medium and executed by a processor of the management computing device.

The management computing device may weight each communication path according to the current situational factors governing the current communication need that have been determined (302). For instance, for each combination of a potential current situational factor and a potential communication path having a particular communication modality, the management computing device may store in a database a number of priority points, or a priority point multiplier, either of which may be positive or negative. As one example, a communication path using NFC as a communication modality may have a higher number of priority points for a current situational factor of high security as compared to a communication path using an unsecured WI-FI connection as a communication modality. Indeed, the latter communication path may even have a negative number of priority points for such a current situational factor. However, the former communication path may have a lower number of priority points for a current situational factor of high urgency as compared to the latter communication path.

As another example, a communication path using IMPI as a communication modality may have a number of priority points that increases by a specified number of points for every predetermined number of minutes that elapse without the managed computing device having sent a status update over IMPI. Therefore, when a status update is received over IMPI, the number of priority points for such a situational factor is reset to zero. If an update is expected every three minutes, if at five minutes an update has not yet been received the number of priority points may be increased by two. Every five minutes thereafter that elapses without an update having been received results in the number of priority points for this communication path and this current situational factor combination increasing by two again. In this way, the hierarchy of communication paths is dynamically determined, both depending on the currently available communication paths and the current situational factors governing the current communication need, as well as on a per-communication path basis considering the current situational factors.

As such, for each current situational factor, a number of priority points is assigned to each communication path (304). The number of priority points assigned to a communication path for each current situational factor are then added together to determine the weight for the communication path (306). Because priority points may be both positive and negative, a communication path having a communication modality that is well suited for some current situational factors but not others receives a total weight that takes into account both the advantages and disadvantages of this modality. A communication path using NFC, for instance, is well suited for high security but not when urgency is required, whereas a communication path using an unsecured WI-FI connection is well suited when urgency is required but not for high security. Depending on whether security or urgency is more desired for a current communication need, as dictated by the current situational factors governing this need, one of these communication paths may ultimately receive a higher weight than the other.

In one implementation, predetermined rules may further be applied against the current communication paths and the current situational factors, such as to modify the weight assigned to at least one communication path (308). Such rules may be employed to enforce outlier conditions. As an example, if a certain level of security is called for, then communication paths having certain communication modalities may have their weights modified to ensure that they are the lowest priority communication paths, or may even be removed from the hierarchy altogether. For instance, when the utmost in security is needed, a communication path using an unsecured WI-FI connection may be removed from the hierarchy altogether, even if it could satisfy a different current situational factor, such as the urgency with which the current communication need is to be fulfilled. The predetermined rules may be prepared by a network administrator ahead of time, and may be specified algorithmically, or as a series of "if-then" rules.

The communication paths are thus ordered by their assigned weights, as may have been modified by the application of the predetermined rules in part 308, to generate a hierarchy of the communication paths (310). As noted above, the hierarchy may not include all the available communication paths. The resulting hierarchy is ordered from a highest priority communication path to a lowest priority communication path. The highest priority communication path is the preferred communication path over which the management computing device is to communicate with the managed computing device. Each successively lower in priority communication path is a fallback communication path when communication is not achieved over a higher priority communication path.

The method 300 is a combination weight-and-rule-based approach. If part 308 is not employed, then the method 300 is a weight-based approach. If just part 308 is employed, then the method 300 is a rule-based approach. For example, an administrator may specify an algorithm that when executed by the management device orders the communication paths in a hierarchy based on the current situational factors. An administrator may specify a series of "if-then" rules that when applied against the communication paths and the current situational factors results in the generation of a hierarchy as well. In either case, such a rule-based approach does not explicitly assign weights to the communication paths as is done in a weight-based approach or in a combination weight-and-rule-based approach.

Figure 4:
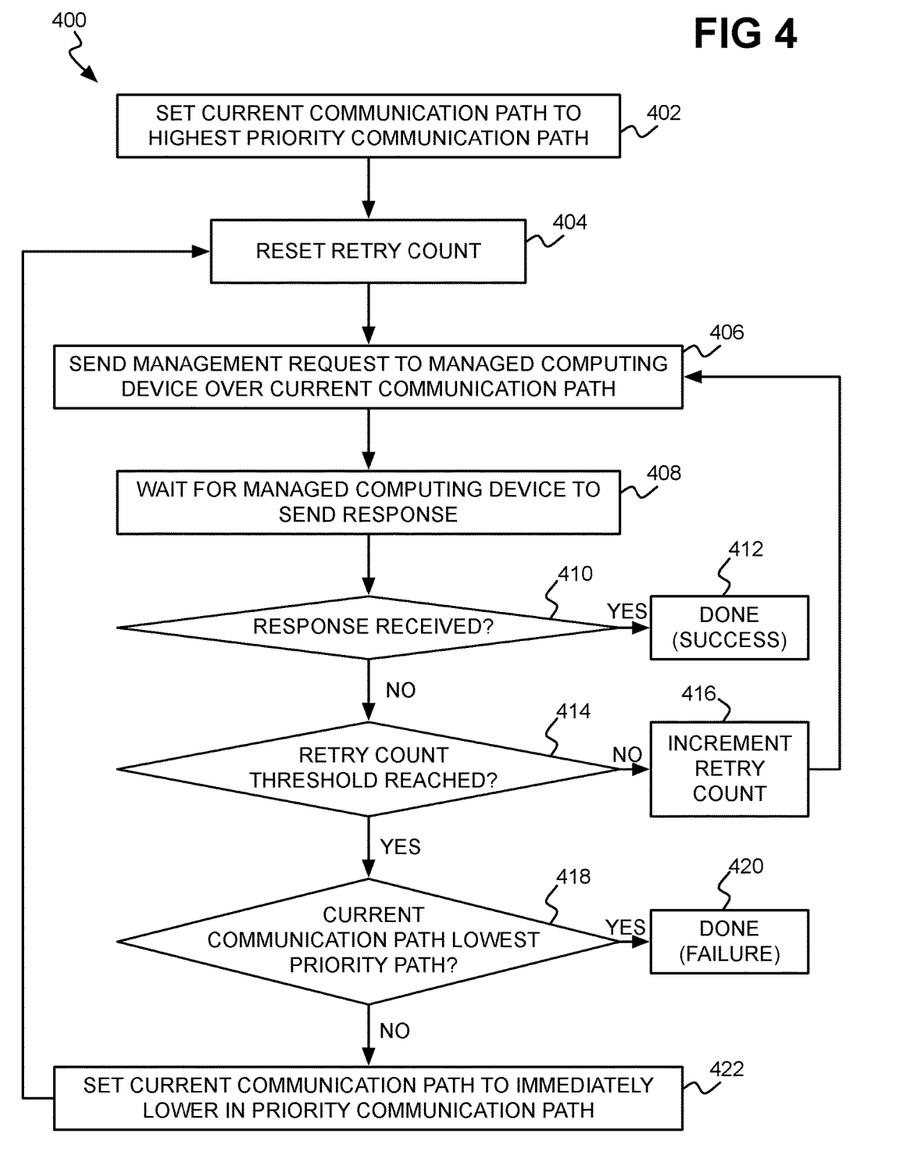
FIG. 4 is a flowchart of an example method for using a hierarchy of communication paths to communicate with a managed computing device.

FIG. 4 shows an example method 400 for using a hierarchy of communication paths to communicate with a managed computing device. The management computing device can perform the method 400, such as to implement part 108 of the method 100. As such, the method 400 may be implemented as computer-executable code stored on a non-transitory computer-readable data storage medium and executed by a processor of the management computing device.

The management computing device sets a current communication path to the highest priority communication path of the hierarchy of communication paths (402). The management computing device may reset a retry count (404), which is used to count the number of times the management device retries the current communication path before proceeding to the next lower in priority communication path in the hierarchy. The management computing device sends a management request to the managed computing device, over the current communication path (406).

The management request is a request that the management computing device formulates to receive or send information to the managed computing device over the current communication path to satisfy the current communication need. For example, if the current communication need is for various status information of the managed computing device, the request is a request for this status information. As another example, if the current communication need is to set various configuration parameters of the managed computing device, the request is a request to set these configuration parameters to desired values.

The management computing device can wait for a predetermined length of time to receive a response to the request from the managed computing device (408). The length of time that the management computing device waits, which may be referred to as a time-out value, may vary depending on the communication modality of the current communication path. For example, a request sent over a high-speed wired Internet connection should elicit a response from the managed computing device sooner than a request sent over a 3G cellular data connection. If the management computing device receives a response from the managed computing device, such as over the current communication path (410), then the method 400 is finished with the management computing device successfully fulfilling the current communication need.

However, if no response is received from the managed computing device (410), then if the retry count has not yet reached a retry count threshold (414), the retry count is incremented, and the management computing device again sends a management request to the managed computing device over the same current communication path (406). The retry count threshold specifies the number of times the management computing device will retry the current communication path before proceeding to the next communication path in the hierarchy. If the threshold is set to zero, then effectively no retries of the current communication path will be attempted.

Once the retry count has reached the retry count threshold (414) after no response having been received from the managed computing device using the current communication path (410), then if the current communication path is the lowest priority path in the hierarchy (418), the method 400 is finished unsuccessfully (420). That is, if part 420 of the method 400 is reached, this means that the management computing device has proceeded with the entire hierarchy of communication paths, potentially retrying each path one or more times, without successfully receiving a response to its management request. The managed computing device may have suffered from a catastrophic failure, for instance, which prevents the managed device from being reached over any communication path.

However, if the retry count has reached the threshold (414) after no response has been received using the current communication path (410) but the current communication path is not the lowest priority path in the hierarchy (418), then the management computing device sets the current communication path to the path in the hierarchy having an immediately lower priority (422), and repeats the method 400 at part 404. In effect, then, by performing the method 400, the management computing device proceeds through the hierarchy of communication paths in attempting to reach the managed computing device, until it has successfully received a response from the managed device, or until all the paths have been tried without success. If a response is received from the managed device, it is said that the hierarchy of communication paths has been used to satisfy or fulfill the current communication need.

Figure 5:
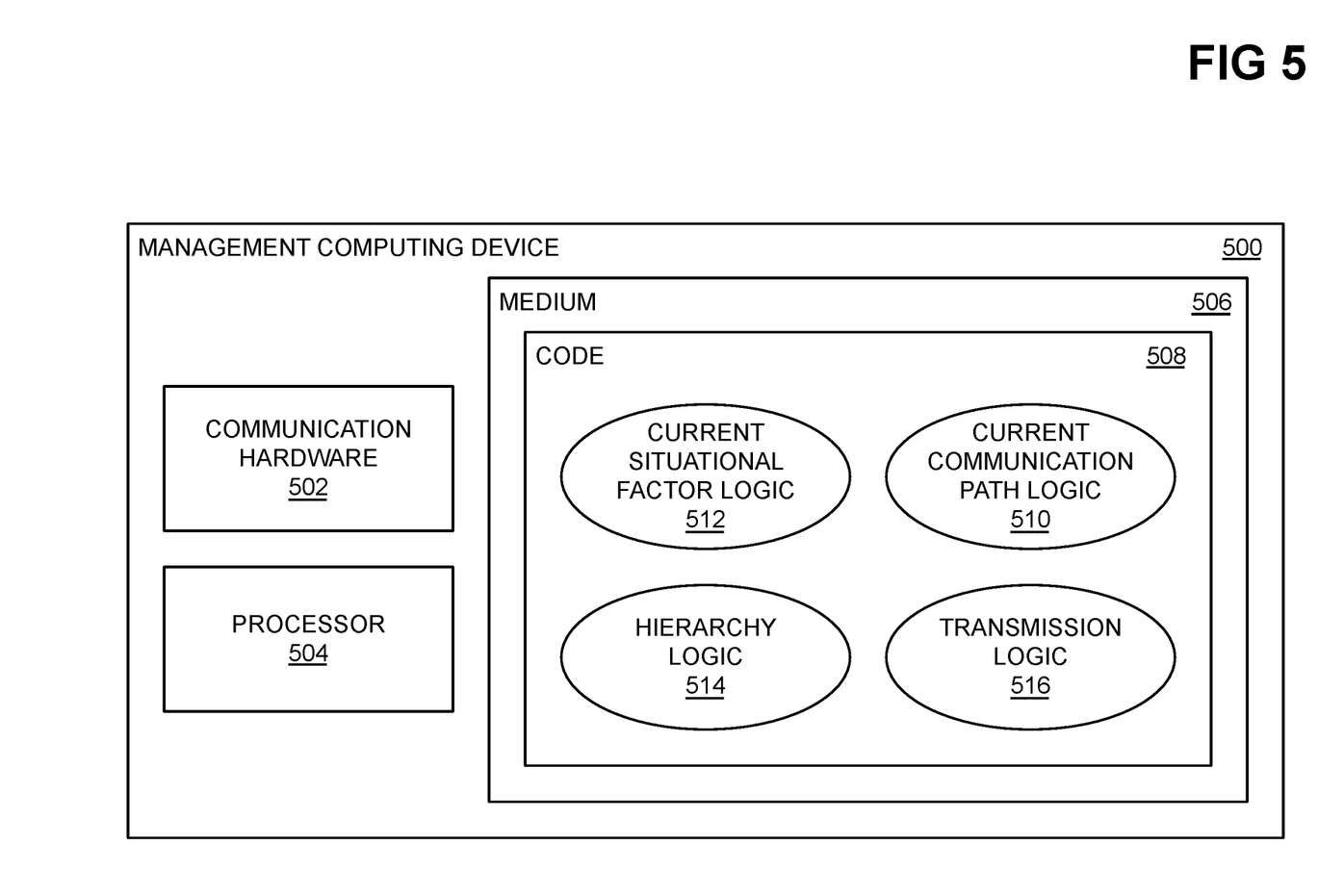
FIG. 5 is a diagram of an example management computing device.

FIG. 5 shows an example implementation of a management computing device 500. The management computing device 500 includes various communication hardware 502 to permit the management device 500 to communicate with a managed computing device over communication paths having different communication modalities. For example, the communication hardware 502 can include a wired network adapter for communication over a communication path using a wired Internet connection, as well as a wireless network adapter for communication over a communication path using a wireless Internet connection. Other examples of such communication hardware 502 can include a telephony modem for communication over a communication path using an analog telephone line, and a cellular data modem for communication over a communication path using LTE or 4G wireless data communication.

The management computing device 500 includes a processor 504 and a non-transitory computer-readable data storage medium 506 that stores computer-executable code 508. The processor 504 executes the code 508 to cause various logic 510, 512, 514, and 516 to be performed. That is, the code 508 implements the logic 510, 512, 514, and 516.

The current communication path logic 510 determines the communication paths between the management computing device 500 and a managed computing device, and thus performs part 102 of the method 100. The current situational factor logic 512 determines the current situational factors governing the current communication need between the management and managed computing devices, and thus performs part 104 of the method 100. The hierarchy logic 514 determines or generates a hierarchy of the communication paths based on the current situational factors, and thus performs part 106 of the method 100. The transmission logic 516 proceeds through the determined hierarchy to send a management request to the managed computing device until the current communication need has been fulfilled, and thus performs part 108 of the method 100.

The techniques that have been described thus permit a management computing device to use the best possible communication path to communicate with a managed computing device, taking into account the available communication paths between the devices and the current situational factors governing the communication need. As the current situational factors change and as the current communication need changes, the hierarchy of communication paths can change, and as such the optimal communication path may differ. Such a dynamic approach ensures that the optimal communication path is selected for each communication need, without a network administrator having to manually specify which path to use to satisfy or fulfill a given communication need each time such a need exists.

As used herein, a computing device can be a physical computing device running a single instance of an operating system (OS). A computing device can also including a virtual computing device, such as a container or virtual machine. For instance, a number of virtual machines, each with its own guest OS, can run on a single physical computing device, or even in a distributed fashion over a number of computing devices. In such instance, a virtual machine may be migrated from one set of computing hardware resources to another set of computing hardware resources, such as from one physical computing device to another, without a user or the virtual machine being aware.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Examples of non-transitory computer-readable media include both volatile such media, like volatile semiconductor memories, as well as non-volatile such media, like non-volatile semiconductor memories and magnetic storage devices. It is manifestly intended that this invention be limited only by the claims and equivalents thereof.

We claim:
1. A method comprising:
    determining a plurality of communication paths between a management computing device and a managed computing device, the communication paths having different communication modalities;
    determining a plurality of current situational factors governing a current communication need between the management computing device and the managed computing device;
    determining a hierarchy of the communication paths, from a highest priority communication path to a lowest priority communication path, based on the current situational factors; and
    successively sending a management request for the current communication need, from the management computing device to the managed computing device, using one of the communication paths starting with the highest communication path and proceeding through the hierarchy until the current communication need has been fulfilled, comprising:
        setting a current communication path to the highest priority communication path;
        repeatedly sending the management request from the management computing device to the managed computing device over the current communication path, and if the management computing device fails to receive a response from the managed computing device over the current communication path and the current communication path is not the lowest priority communication path, setting the current communication path to the communication path in the hierarchy that is immediately lower in priority than the current communication path,
        until the management computing device receives the response from the managed computing device, or the management computing device failed to receive the response from the managed computing device and the current communication path is the lowest priority communication path.

2. The method of claim 1, wherein successively sending the management request for the current communication need, from the management computing device to the managed computing device, using the one of the communication paths starting with the highest communication path and proceeding through the hierarchy until the current communication need has been fulfilled further comprises:
    after sending the management request and before setting the current communication path to the communication path in the hierarchy that is immediately lower in priority,
        waiting for a period of time for the managed computing device to send the response to the management computing device.

3. The method of claim 2, wherein successively sending the management request for the current communication need, from the management computing device to the managed computing device, using the one of the communication paths starting with the highest communication path and proceeding through the hierarchy until the current communication need has been fulfilled further comprises:
    after waiting for the period of time for the managed computing device to send the response to the management computing device, retrying the current communication path to send the management request one or more times before setting the current communication path to the communication path in the hierarchy that is immediately lower in priority.

4. The method of claim 1, wherein the current situational factors comprise one or more of: a required security of the current communication need; a required urgency of the current communication need; a type of data of the current communication need; an amount of data of the current communication need; user preference; a length of time since last contact from the managed computing device; an amount of power available to satisfy the current communication need; and a desired monetary cost in satisfying the current communication need.

5. The method of claim 1, wherein determining the hierarchy of the communication paths comprises:
- weighting each communication path according to the current situational factors as the current situational factors apply to the communication path; and
- ordering the communication paths based on weights assigned thereto, from a most weighted communication path to a least weighted communication path.

6. The method of claim 5, wherein weighting each communication path comprises:
- for each current situational factor, assigning a number of points to the communication path; and
- adding together the number of points assigned to the communication path for each current situational factor to determine the weight assigned to the communication path.

7. The method of claim 5, wherein determining the hierarchy of the communication paths further comprises:
- after weighting each communication path and before ordering the communication paths based on the weights assigned thereto, applying a plurality of predetermined rules against the communication paths and the current situational factors to modify the weight assigned to at least one of the communication paths.

8. The method of claim 1, wherein determining the hierarchy of the communication paths comprises:
- applying a plurality of predetermined rules against the communication paths and the current situational factors.

9. A non-transitory computer-readable data storage medium storing computer-executable code executable by a management computing device for a managed computing device, to perform a method comprising:
- determining a plurality of communication paths between a management computing device and a managed computing device, the communication paths having different communication modalities;
- determining a plurality of current situational factors governing a current communication need between the management computing device and the managed computing device;
- determining a hierarchy of the communication paths, from a highest priority communication path to a lowest priority communication path, based on the current situational factors; and
- successively sending a management request for the current communication need, from the management computing device to the managed computing device, using one of the communication paths starting with the highest communication path and proceeding through the hierarchy until the current communication need has been fulfilled, comprising:
  - setting a current communication path to the highest priority communication path;
  - repeatedly sending the management request from the management computing device to the managed computing device over the current communication path, and if the management computing device fails to receive a response from the managed computing device over the current communication path and the current communication path is not the lowest priority communication path, setting the current communication path to the communication path in the hierarchy that is immediately lower in priority than the current communication path,
  - until the management computing device receives the response from the managed computing device, or the management computing device failed to receive the response from the managed computing device and the current communication path is the lowest priority communication path.

10. The non-transitory computer-readable data storage medium of claim 9, wherein successively sending the management request for the current communication need, from the management computing device to the managed computing device, using the one of the communication paths starting with the highest communication path and proceeding through the hierarchy until the current communication need has been fulfilled further comprises:
- after sending the management request and before setting the current communication path to the communication path in the hierarchy that is immediately lower in priority,
  - waiting for a period of time for the managed computing device to send the response to the management computing device.

11. The non-transitory computer-readable data storage medium of claim 9, wherein the different communication modalities comprise one or more of: integrated platform management interface (IPMI) communication; wired communication; wireless communication; out-of-band (OOB) communication; near-field communication (NFC); telephony communication; and cellular communication.

12. The non-transitory computer-readable data storage medium of claim 9, wherein the current situational factors comprise one or more of: a required security of the current communication need; a required urgency of the current communication need; a type of data of the current communication need; an amount of data of the current communication need; user preference; a length of time since last contact from the managed computing device; an amount of power available to satisfy the current communication need; and a desired monetary cost in satisfying the current communication need.

13. The non-transitory computer-readable data storage medium of claim 9, wherein determining the hierarchy of the communication paths comprises:
- weighting each communication path according to the current situational factors as the current situational factors apply to the communication path; and
- ordering the communication paths based on weights assigned thereto, from a most weighted communication path to a least weighted communication path.

14. The non-transitory computer-readable data storage medium of claim 9, wherein determining the hierarchy of the communication paths comprises:
- applying a plurality of predetermined rules against the communication paths and the current situational factors.

15. A management computing device for a managed computing device, comprising:

communication hardware to communicate with the managed computing device over a plurality of communication paths having different communication modalities;

a processor to:
   determine the plurality of communication paths between the management computing device and the managed computing device;
   determine a plurality of current situational factors governing a current communication need between the management computing device and the managed computing device;
   determine a hierarchy of the communication paths, from a highest priority communication path to a lowest priority communication path, based on the current situational factors; and
   successively send a management request for the current communication need, from the management computing device to the managed computing device, using one of the communication paths starting with the highest communication path and proceeding through the hierarchy until the current communication need has been fulfilled, comprising:
      setting a current communication path to the highest priority communication path;
      repeatedly sending the management request from the management computing device to the managed computing device over the current communication path, and if the management computing device fails to receive a response from the managed computing device over the current communication path and the current communication path is not the lowest priority communication path, setting the current communication path to the communication path in the hierarchy that is immediately lower in priority than the current communication path,
      until the management computing device receives the response from the managed computing device, or the management computing device failed to receive the response from the managed computing device and the current communication path is the lowest priority communication path.

16. The management computing device of claim 15, wherein the processor is to successively send the management request for the current communication need, from the management computing device to the managed computing device, using the one of the communication paths starting with the highest communication path and proceeding through the hierarchy until the current communication need has been fulfilled by further:
   after sending the management request and before setting the current communication path to the communication path in the hierarchy that is immediately lower in priority,
      waiting for a period of time for the managed computing device to send the response to the management computing device.

17. The management computing device of claim 15, wherein the different communication modalities comprise one or more of: integrated platform management interface (IPMI) communication; wired communication; wireless communication; out-of-band (OOB) communication; near-field communication (NFC); telephony communication; and cellular communication.

18. The management computing device of claim 15, wherein the current situational factors comprise one or more of: a required security of the current communication need; a required urgency of the current communication need; a type of data of the current communication need; an amount of data of the current communication need; user preference; a length of time since last contact from the managed computing device; an amount of power available to satisfy the current communication need; and a desired monetary cost in satisfying the current communication need.

19. The management computing device of claim 15, wherein the processor is to determine the hierarchy of the communication paths by:
   weighting each communication path according to the current situational factors as the current situational factors apply to the communication path; and
   ordering the communication paths based on weights assigned thereto, from a most weighted communication path to a least weighted communication path.

20. The management computing device of claim 15, wherein the processor is to determine the hierarchy of the communication paths by:
   applying a plurality of predetermined rules against the communication paths and the current situational factors.

* * * * *